US008179422B2

(12) United States Patent
Wu et al.

(10) Patent No.: US 8,179,422 B2
(45) Date of Patent: May 15, 2012

(54) SYSTEM AND METHOD FOR VIDEO CONFERENCING

(75) Inventors: Duanpei Wu, San Jose, CA (US); Shantanu Sarkar, San Jose, CA (US); Nermin M. Ismail, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1081 days.

(21) Appl. No.: 11/961,710

(22) Filed: Dec. 20, 2007

(65) Prior Publication Data

US 2009/0160929 A1   Jun. 25, 2009

(51) Int. Cl.
*H04N 7/14* (2006.01)

(52) U.S. Cl. .................................. 348/14.09; 348/14.08

(58) Field of Classification Search ............... 348/14.01, 348/14.02, 14.08–14.11; 709/204; 370/259, 370/260
See application file for complete search history.

(56) References Cited

U.S. PATENT DOCUMENTS

| | | | | |
|---|---|---|---|---|
| 5,007,049 A | 4/1991 | Erving et al. | ................. | 370/32.1 |
| 5,058,153 A | 10/1991 | Carew et al. | .................. | 379/390 |
| 5,844,600 A | 12/1998 | Kerr | ........................... | 348/14.12 |
| 5,848,098 A | 12/1998 | Cheng et al. | .................. | 375/220 |
| 6,078,809 A | 6/2000 | Proctor | ......................... | 455/416 |
| 6,128,649 A | 10/2000 | Smith et al. | .................... | 709/217 |
| 6,148,068 A | 11/2000 | Lowery et al. | ................ | 379/202 |
| 6,300,973 B1 | 10/2001 | Feder et al. | ................ | 348/14.09 |
| 6,327,276 B1 | 12/2001 | Robert et al. | ................. | 370/535 |
| 6,535,604 B1 | 3/2003 | Provencal et al. | ....... | 379/388.06 |
| 6,590,604 B1 | 7/2003 | Tucker et al. | ............. | 348/14.13 |
| 6,989,856 B2 | 1/2006 | Firestone et al. | .......... | 348/14.09 |
| 2004/0008635 A1 | 1/2004 | Nelson et al. | ................. | 370/260 |
| 2007/0153712 A1* | 7/2007 | Fry et al. | ........................ | 370/263 |
| 2007/0186002 A1* | 8/2007 | Campbell et al. | ............. | 709/231 |
| 2008/0273079 A1* | 11/2008 | Campbell et al. | .......... | 348/14.08 |

FOREIGN PATENT DOCUMENTS

JP    7202887    8/1995

OTHER PUBLICATIONS

Notification of Transmittal of the International Search Report and the Written Opinion of the International Searching Authority, or the Declaration in International Application No. PCT/US04/32977, 15 pgs., Mailed Feb. 25, 2005.

* cited by examiner

*Primary Examiner* — Tuan Nguyen (74) *Attorney, Agent, or Firm* — Baker Botts L.L.P.

(57) ABSTRACT

In one embodiment, an apparatus includes two modules. A first module receives a request from a first endpoint to subscribe to a voice activated multicast group and causes the first endpoint to receive a current speaker's video stream if the first endpoint is not the current speaker and to receive a last speaker's video stream if the first endpoint is the current speaker. A second module receives a request from a second endpoint to subscribe to a continuous presence multicast group and causes the second endpoint to receive a continuous presence, current speaker video stream if the second endpoint is not the current speaker and to receive a continuous presence, last speaker video stream if the second endpoint is the current speaker. The continuous presence, current speaker video stream includes a composition or two or more video streams, one of which includes at least a portion of the current speaker's video stream. The continuous presence, last speaker video stream includes a composition or two or more video streams, one of which includes at least a portion of a last speaker's video stream.

21 Claims, 9 Drawing Sheets

|  | STREAM ID | MEDIA SWITCH |
|---|---|---|
| 1st SPK | EP 3-1 in | MS3 |
| 2nd SPK | EP 2-1 in | MS2 |
| 2nd SPK TGT | VB-LS | MS1 |

FIG. 4

|  | STREAM ID | MEDIA SWITCH |
|---|---|---|
| 1st SPK | $CP_{CS}$ | MS1 |
| 2nd SPK | $CP_{LS}$ | MS1 |
| 2nd SPK TGT | EP 3-1 out | MS3 |

SYSTEM AND METHOD FOR VIDEO CONFERENCING

TECHNICAL FIELD

The present disclosure relates generally to the field of communications.

BACKGROUND

A centralized multipoint control unit (MCU) is traditionally used to support video conferencing. A conference server receives media streams from the endpoints, mixes the streams, and sends individual streams back to the endpoints. The mixing may include composition (for example), creating a two-by-two composition of four video streams. Each of these sub-streams can be locked to a particular user or voice-switched where appropriate. Other possible compositions can be one-by-one, one-by-two, three-by-three, etc. It is critical that timing and synchronization be precise in such video-conferencing scenarios. Additionally, bandwidth considerations should be recognized and appreciated in attempting to accommodate optimal video conferences. Accordingly, the ability to provide an effective mechanism to properly direct communications for an end user/endpoint, or to offer an appropriate protocol that optimizes bandwidth characteristics and parameters provides a significant challenge to network operators, component manufacturers, and system designers.

DESCRIPTION OF EXAMPLE EMBODIMENTS

Overview

In one embodiment, an apparatus includes two modules. A first module receives a request from a first endpoint to subscribe to a voice activated multicast group and causes the first endpoint to receive a current speaker's video stream if the first endpoint is not the current speaker and to receive a last speaker's video stream if the first endpoint is the current speaker. A second module receives a request from a second endpoint to subscribe to a continuous presence multicast group and causes the second endpoint to receive a continuous presence, current speaker video stream if the second endpoint is not the current speaker and to receive a continuous presence, last speaker video stream if the second endpoint is the current speaker. The continuous presence, current speaker video stream includes a composition or two or more video streams, one of which includes at least a portion of the current speaker's video stream. The continuous presence, last speaker video stream includes a composition or two or more video streams, one of which includes at least a portion of a last speaker's video stream.

In another embodiment, a system includes one or more VA end points, one or more VP end points, and a stream controller. The VA endpoints are subscribed to a voice activated multicast group, and the CP end points are subscribed to a continuous presence multicast group. The stream controller instructs a media switch to multicast a current speaker's stream to each VA endpoint that is not the current speaker. The stream controller also instructs the media switch to multicast a continuous presence, current speaker stream to each CP endpoint that is not the current speaker. The continuous presence, current speaker video stream includes a composition or two or more video streams, one of which includes at least a portion of the current speaker's video stream.

DESCRIPTION

Figure 1:
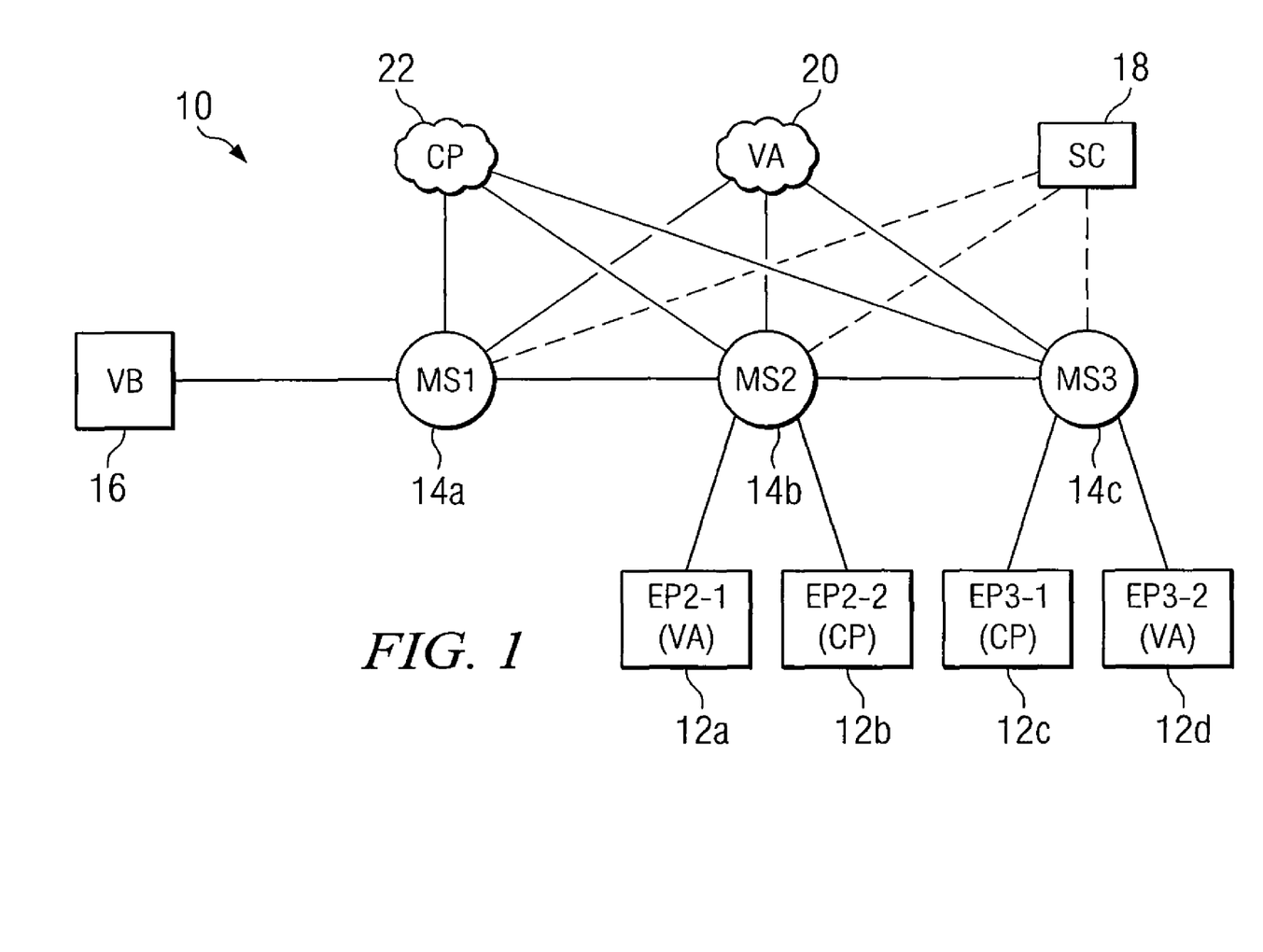
FIG. 1 illustrates an example of a distributed video conferencing system that supports both voice activated (VA) and continuous presence (CP) streams.

FIG. 1 illustrates an example of a distributed video conferencing system 10 that supports both voice activated (VA) and continuous presence (CP) multicast streams. System 10 includes endpoints 12a, 12b, 12c, and 12d (generally, endpoints 12); media switches 14a, 14b, and 14c (generally, media switches 14); video bridge 16; and stream controller 18. Distributed video conferencing system 10 supports both a voice activated multicast group 20 and a continuous presence multicast group 22.

Endpoints 12 represent clients that participate in a video conferencing session in communication system 10. Endpoints 12 may include devices that end users or other devices may use to initiate or participate in a communication, such as a computer, a personal digital assistant (PDA), a laptop, an electronic notebook, a telephone, a mobile station, an audio IP phone, a video phone appliance, a personal computer (PC) based video phone, a streaming client, or any other device, component, element, or object capable of engaging in voice, video, or data exchanges within communication system 10. Endpoints 12 may include a suitable interface to a human user, such as a microphone, a display, a keyboard, a whiteboard, a video-conferencing interface, or other terminal equipment. Endpoints 12 may also be any device that seeks to initiate or participate in a communication on behalf of another entity or element, such as a program, a database, an application, a piece of software, or any other component, device, element, or object capable of initiating a voice, a video, or a data exchange within communication system 10. Data, as used herein in this document, refers to any type of numeric, voice and audio, video, audio-visual, or script data, or any type of source or object code, or any other suitable information in any appropriate format that may be communicated from one point to another.

Media switches 14 assist in supporting the video conference. Each media switch 14 can perform a number of functions. Each media switch 14 may register its capabilities at startup, which may include any of the following media processing functions: 1) audio mixing that mixes audio of loudest speakers, distributes loudest speaker information to other media switches 14; 2) audio transcoding that provides audio transcoding (codec translation) services that can be used by other network devices without necessary resources (e.g., DSPs) to perform audio transcoding on their own; 3) video composition that processes video by creating a composite view (i.e. Hollywood Squares scenario) of a set of participants; 4) video transrating that provides video transrating (bandwidth reduction by changing video quantization parameters) service that can be used by other network devices without necessary resources (e.g., DSPs) to perform video transrating on their own; 5) video transcoding that provides video transcoding (codec translation) services that can be used by other network devices without necessary resources (e.g., DSPs) to perform video transcoding on their own; 6) media switching that represents the interface between the edge of the network (toward endpoints) and the core of the network (toward other media switches). Each media switch 14 may include any suitable combination of hardware, software, algorithms, processors, devices, components, objects, application specific integrated circuits (ASICs), or elements operable to facilitate the video-conferencing capabilities and operations described in this document. As used herein, a video or video stream may or may not also involve audio information.

Video bridge 16 may perform any of the above media processing functions described above with reference to media switches 14. In particular, video bridge 16 may receive two or more video streams and generate video stream that present a composition view of the received video streams. The resulting composition video stream allows a user to view simultaneously at least a portion of the video streams that make up the composition. As described below, video bridge generates the continuous presence streams, which is a composite of two or more streams.

Video bridge 16 may be provided as a service of one or more of media switches 14. At shown in the example illustrated in FIG. 1, video bridge 16 may be an element external to and in communication with media switches 14. Alternatively, video bridge 16 may be internal to media switches 14 or even replace one or more media switches 14. Also, in another alternative embodiment, endpoint 12 may contain video bridging functionality. Video bridge 16 may be combined with other networking equipment. For example, video bridge 16 may be provided in a router, a gateway, a switch, a loadbalancer, or in any other suitable location operable to facilitate their operations.

Video bridge 16 may be equipped with an audio mixer and/or video mixer. In a particular embodiment of the present invention, video bridge 16 may include suitable software to provide the capabilities of distributed video conferencing or to execute the operations of communication system 10 as described herein. In other embodiments, these functionalities may be provided within a given network element (as described above) or performed by suitable hardware, algorithms, processors, devices, ASICs, components, objects, or elements. Note that any combination of these elements may also be used in given applications of video conferencing within communication system 10.

Stream controller 18 provides instructions to endpoints 12, media switches 14, and video bridge 16 to control communication of the video streams (including multicasting and unicasting). Stream controller 18 may be any other suitable combination of hardware, software, algorithms, processors, devices, components, objects, application specific integrated circuits (ASICs), or elements operable to facilitate any of the video-conferencing control functions. Steam controller 18 may be a separate external module (as illustrated in FIG. 1), or it may be functionality built into or associated with one or more other modules, such as endpoints 12, media switches 14, video bridge 16, routers, gateways, switches, loadbalancers, or any other suitable communication or processing equipment.

Distributed video conferencing system 10 supports both a voice activated multicast group 20 and a continuous presence multicast group 22. Each endpoint 12 may subscribe to a voice activated multicast group 20 or continuous presence multicast group 22 and thus receive the video stream associated with that particular multicast group. Likewise, endpoints 12 may multicast their video streams. In a particular embodiment, voice activated multicast group 20 and continuous presence multicast group 22 may be source specific multicast (SSM) groups. For participants that do not have endpoints 12 that support multicasting, one of media switches 14 or video bridge 16 may act as an intermediary between the participants' endpoint 12 and the rest of system 10.

Voice activated multicast group 20 is associated with the voice activated stream, which carries the video of the current speaker at any given time. However, if the current speaker is subscribed to the voice activated multicast group 20, the current speaker typically will receive the last speaker video stream as opposed to the current speaker video stream.

Continuous presence multicast group 22 is associated with a continuous presence stream, which is a stream composed from several streams, one of which is typically the voice activated stream (i.e., the video of the current active speaker at any given time). Again, as with the voice activated multicast group 20, if the current speaker is subscribed to the continuous presence multicast group 22, the current speaker typically will see the last speaker (as opposed to the current speaker) as part of his or her continuous presence stream.

Apart from these different stream types, system 10 may accommodate endpoints 12 that support different video characteristics in terms of codec types, frame rates, bit rates, etc. Thus, system 10 may be able to transcode and transrate video streams so that the same stream (voice activated stream or continuous presence stream) may be sent to several endpoints 12 that support different video codecs. In a particular embodiment, several voice activated multicast groups 20 may be assigned to accommodate other various video characteristics, and several continuous presence multicast groups 22 may be assigned to accommodate other various video characteristics Video conference participants, who are interested in receiving the voice activated streams or continuous presence streams, subscribe to the appropriate one of voice activated multicast group 20 or continuous presence multicast group 22. Endpoints 12 that subscribe to voice activated multicast group 20, are called voice activated clients (VA clients). As indicated in FIG. 1, endpoints 12a and 12d are VA client. Endpoints 12 that subscribe to continuous presence multicast group 22, are called continuous presence clients (CP clients). As indicated in FIG. 1, endpoints 12b and 12c are CP client.

As described above, the voice activated streams or continuous presence streams may include a current speaker (CS) stream and/or a last speaker (LS) stream. In a particular embodiment, the current speaker stream candidates are one or more streams from endpoints 12 with the loudest audio. In such an embodiment, stream controller 18 may select the stream that has the loudest audio and thus qualify as the current speaker stream. A current speaker stream becomes the last speaker stream when one of the other streams from endpoints 12 are selected to the be the current speaker stream. For example, in the particular embodiment in which the current speaker stream is the stream with the loudest audio, the current speaker stream becomes the last speaker stream when at least one of the other streams from endpoints 12 has a higher audio volume. To support VA clients, the current speaker stream is typically multicast so that any endpoint 12 requiring the stream can receive it, and the last speaker stream is typically unicast to endpoint 12 associated with the current speaker.

In operation, distributed video conference system 10 supports a mixed mode of both voice activated streams and continuous presence streams. For VA clients, endpoint 12 associated with the current speaker receives the last speaker video stream from endpoint 12 associated with the last speaker, and other endpoints 12 receive the current speaker video stream from endpoint 12 associated with the current speaker. Typically, stream controller 18 sends a signal to the media switch 14 that hosts endpoint 12 associated with the current speaker to instruct the media switch 14 to multicast its endpoint video stream to one or more endpoints 12 subscribed to voice activated multicast groups 20. In addition, stream controller 18 may send a signal to the media switch 14 that hosts endpoint 12 associated with the last speak to instruct the media switch 14 to unicast its video stream to endpoint 12 associated with the current speaker, via the hosting media switch 14. Last speaker endpoint 12 via its media switch 14 may unicast its video stream directly to current active speaker endpoint 12 via its media switch 14. In a particular embodiment, stream controller 18 may send the signal directly to endpoint 12 that has the required capabilities to participate the distributed video conference, such as multicast. Alternatively, last speaker endpoint 12 may communicate its video stream through a transcoder or transrater to current speaker endpoint 12. In a particular embodiment, system 10 may perform bandwidth sharing between the active speaker multicast stream and the last speaker unicast stream.

For CP clients, video bridge 16 generates two CP streams. One of the CP streams has the current speaker video stream as one of its composed videos ($CP_{CS}$). The other CP video stream has the last speaker video stream as one of its composed videos ($CP_{LS}$). Endpoint 12 associated with the current speaker receives the $CP_{LS}$ video stream that has the last speaker video stream as one of its composed videos, and other endpoints 12 receive the $CP_{CS}$ video stream that has the current speaker video stream as one of its composed videos. To generate these two CP video streams, video bridge 16 subscribes to voice activated multicast group 20, so that video bridge 16 receives the current speaker video stream. Moreover, if the current speaker is associated with a CP endpoint 12b or 12c, then stream controller 18 may send a signal to endpoint 12 (in one particular embodiment, via media switch 14) associated with the last speaker to instruct endpoint 12 to unicast its video stream to video bridge 16 so that video bridge 16 can use the last speaker stream to generate the $CP_{LS}$ for communication to endpoint 12b or 12c associated with the current speaker. The last speaker endpoint 12 may unicast its video stream directly to video bridge 16. Alternatively, last speaker endpoint 12 may communicate its video stream through a transcoder or transrater to video bridge 16.

In a particular embodiment, system 10 may perform bandwidth sharing between the active speaker multicast stream and the last speaker unicast stream received by the voice activated participant or video bridge 16. System 10 may also share bandwidth between the $CP_{CS}$ multicast stream and the unicast $CP_{LS}$ stream.

Figure 2:
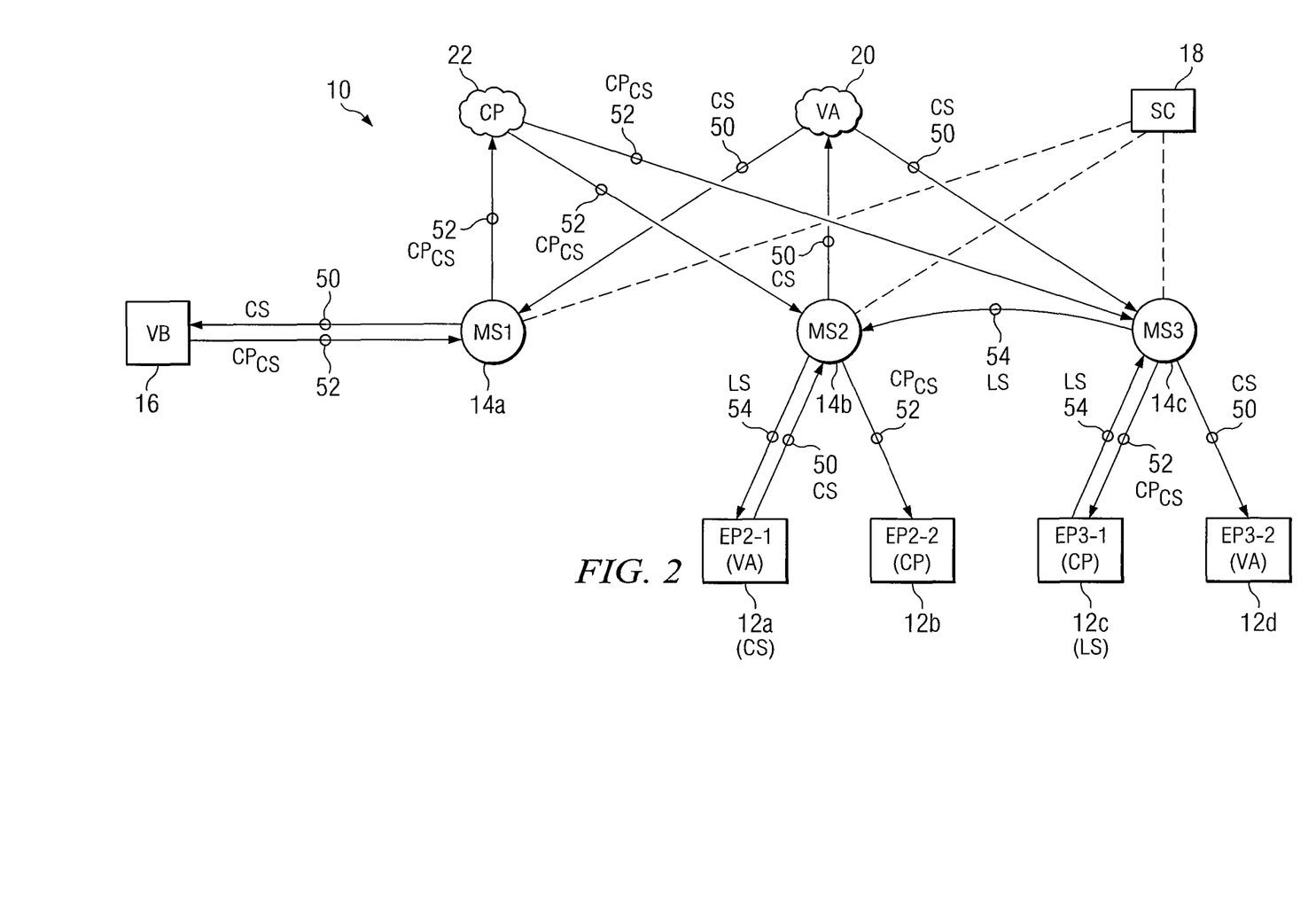
FIG. 2 illustrates the example video conferencing system of FIG. 1 in which the current speaker is a voice activated endpoint.

FIG. 2 illustrates video conferencing system 10 in which the current speaker is endpoint 12a, which is a VA client. There are two multicast groups: (1) voice activated multicast group 20 for current speaker (CS) stream 50 and (2) continuous presence multicast group 22 for continuous presence, current speaker ($CP_{CS}$) stream 52. In this example, endpoints 12a and 12d joined the video conference as a voice activated clients and subscribed to voice activated multicast group 20, and endpoints 12b and 12c joined the video conference as continuous presence clients and subscribed to continuous presence multicast group 22. Endpoint 12a has been designated the current speaker (CS), and endpoint 12c has been designated the last speaker (LS). In addition to endpoints 12a and 12d, video bridge 16 also joined the video conference as a voice activated clients and subscribed to voice activated multicast group 20.

Endpoint 12a, the current speaker, multicasts its current speaker stream 50 to the other VA clients, which include endpoint 12d and video bridge 16. As shown in FIG. 2, endpoint 12a communicates its current speaker stream 50 to media switch 14b, which communicates stream 50 via voice activated multicast group 20 to media switches 14a and 14c. Media switch 14a communicates current speaker stream 50 to video bridge 16, and media switch 14c communicates current speaker stream 50 to endpoint 12d.

Video bridge 16 receives current speaker stream 50, generates continuous presence, current speaker ($CP_{CS}$) stream 52, and multicasts continuous presence, current speaker ($CP_{CS}$) stream 52 to the CP clients, which include endpoints 12b and 12c. Because video bridge 16 is a voice activated client, video bridge 16 receives current speaker stream 50 when that stream is multicast to the voice activated multicast group 20. Video bridge 16 uses current speaker stream 50 to generate continuous presence, current speaker ($CP_{CS}$) stream 52. Continuous presence, current speaker ($CP_{CS}$) stream 52 allows participants to view several streams simultaneously, one of which is the current speaker. The other steams may be fixed streams, streams from other endpoints 12, streams from a video presentation, a slideshow, streams from a computer, or streams from any other suitable visual representation. As shown in FIG. 2, video bridge 16 communicates continuous presence, current speaker ($CP_{CS}$) stream 52 to media switch 14a, which communicates stream 52 via continuous presence multicast group 22 to media switches 14b and 14c. Media switch 14b communicates continuous presence, current speaker ($CP_{CS}$) stream 52 to endpoint 12b, and media switch 14c communicates continuous presence, current speaker ($CP_{CS}$) stream 52 to endpoint 12c.

Endpoint 12c, which is designated as the last speaker in this example, unicasts its last speaker (LS) stream 54 to endpoint 12a, the VA client designated as the current speaker in this example. Endpoint 12a is a VA client and thus would typically receive current speaker stream 50 from voice activated multicast group 20. Because endpoint 12a is the current speaker, current speaker stream 50 would present the participant at endpoint 12a with a video of himself or herself. Rather than present the participant at endpoint 12a with a video of himself or herself, endpoint 12a receives the stream 54 of the last speaker. Endpoint 12c communicates last speaker stream 54 to media switch 14c, which communicates it to media switch 14b. Media switch 14b communicates last speaker stream 54 to endpoint 12a. Because the current speaker is a VA client rather than a CP client, video bridge 16 does not receive the unicast of last speaker stream 54 from the last speaker, endpoint 12c.

Stream controller 18 communicates instructions to media switches 14 to control the processing and/or communication of streams 50, 52, and 54 as described above. In alternative embodiment, stream controller 18 may communicate instructions to endpoints 12 and video bridge 16 regarding the processing and/or communication of streams 50, 52, and 54. Stream controller 18 also may communicate instructions to control the processing or communication of the other streams that video bridge 16 combines with current speaker stream 50 to generate continuous presence, current speaker ($CP_{CS}$) stream 52.

Figure 3:
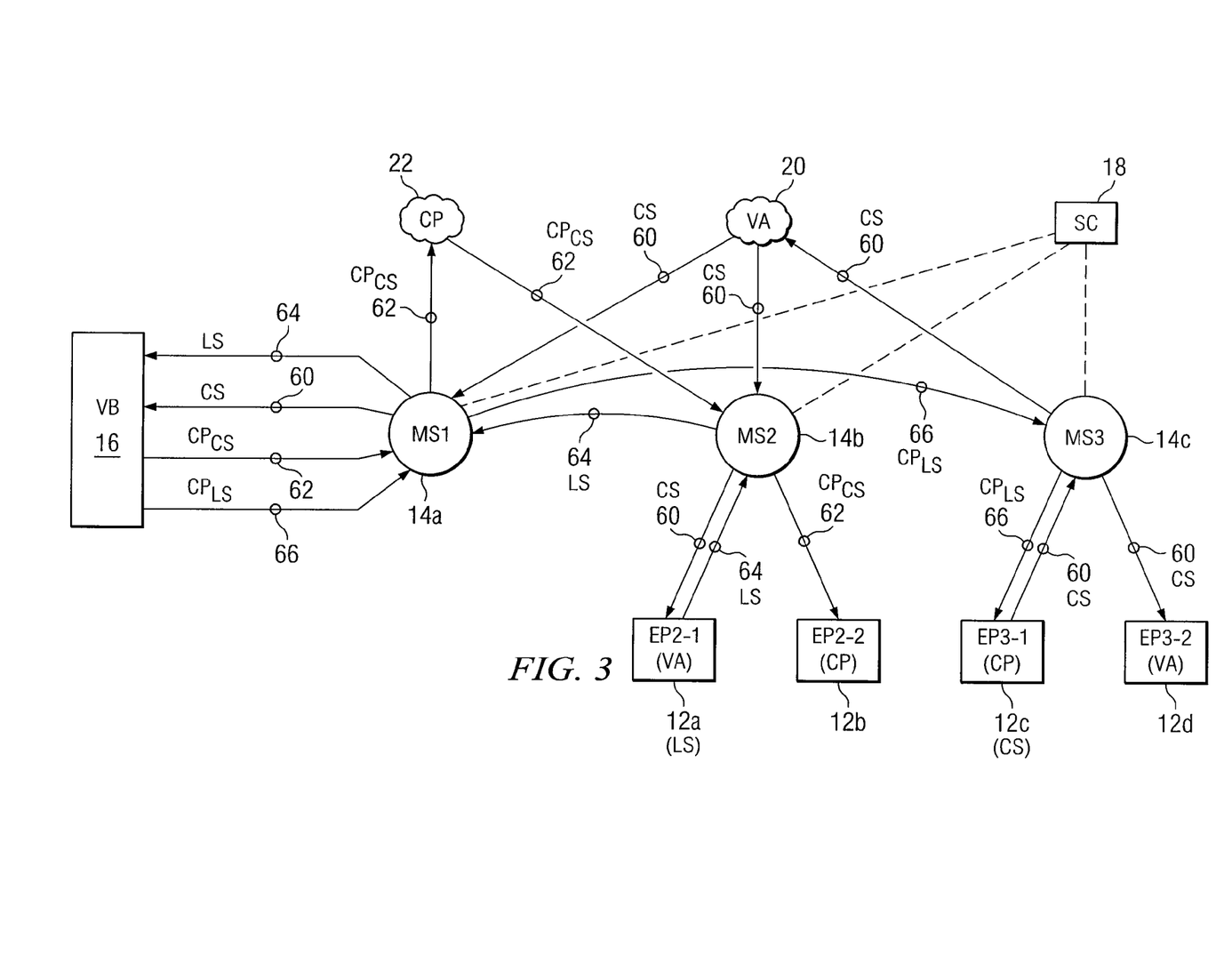
FIG. 3 illustrates the example video conferencing system of FIG. 1 in which the current speaker is a continuous presence endpoint.

FIG. 3 illustrates an example video conferencing system in which the current speaker is a CP client. There are two multicast groups: (1) voice activated multicast group 20 for current speaker stream 60 and (2) continuous presence multicast group 22 for continuous presence, current speaker ($CP_{CS}$) stream 62. In this example, endpoints 12a and 12d joined the video conference as a VA clients and subscribed to voice activated multicast group 20, and endpoints 12b and 12c joined the video conference as CP clients and subscribed to continuous presence multicast group 22. Endpoint 12a has been designated the last speaker (LS), and endpoint 12c has been designated the current speaker (CS). In addition to endpoints 12a and 12d, video bridge 16 also joined the video conference as a voice activated clients and subscribed to voice activated multicast group 20.

Endpoint 12c, the current speaker, multicasts its current speaker stream 60 to the VA clients, which include endpoints 12a and 12d and video bridge 16. Endpoint 12c communicates its current speaker stream 60 to media switch 14c, which communicates stream 60 via voice activated multicast group 20 to media switches 14a and 14c. Media switch 14c also communicates stream 60 to voice activated client, endpoint 14d. Media switch 14a communicates current speaker stream 60 to video bridge 16, and media switch 14b communicates current speaker stream 60 to endpoint 12a.

Video bridge 16 receives current speaker stream 60, generates continuous presence, current speaker ($CP_{CS}$) stream 62, multicasts continuous presence, current speaker ($CP_{CS}$) stream 62 to the CP clients, in this case, endpoint 12b. Because video bridge 16 is a VA client, video bridge 16 receives current speaker stream 60 when that stream is multicast to the voice activated multicast group 20. Video bridge 16 uses current speaker stream 60 to generate continuous presence, current speaker ($CP_{CS}$) stream 62. Continuous presence, current speaker ($CP_{CS}$) stream 62 allows participants to view several streams simultaneously, one of which is the current speaker. The other steams may be fixed streams, streams from other endpoints 12, streams from a video presentation, a slideshow, streams from a computer, or streams from any other suitable visual representation. Video bridge 16 communicates continuous presence, current speaker ($CP_{CS}$) stream 62 to media switch 14a, which communicates stream 62 via continuous presence multicast group 22 to media switches 14b. Media switch 14b communicates continuous presence, current speaker ($CP_{CS}$) stream 62 to endpoint 12b.

Endpoint 12a, which is designated as the last speaker in this example, unicasts its last speaker (LS) stream 64 to video bridge 16. The current speaker is associated which endpoint 12c, a CP client. Endpoint 12c, as a CP client, would typically receive continuous presence, current speaker ($CP_{CS}$) stream 62 from continuous presence multicast group 22. Because endpoint 12c is the current speaker, continuous presence, current speaker ($CP_{CS}$) stream 62 would present the participant at endpoint 12c with a video of himself or herself. Rather than present the participant at endpoint 12c with a video of himself or herself, endpoint 12c receives continuous presence, last speaker ($CP_{LS}$) stream 66, which is the continuous presence stream with the last speaker video instead of the current speaker video. Endpoint 12a communicates last speaker stream 64 to media switch 14b, which communicates it to media switch 14a. Media switch 14a communicates last speaker stream 64 to video bridge 16. Because the current speaker, endpoint 12b, is a CP client rather than a VA client, last speaker stream 64 is not unicast to the current speaker.

Video bridge 16 uses last speaker stream 64 to generate continuous presence, last speaker ($CP_{LS}$) stream 66. Continuous presence, last speaker ($CP_{LS}$) stream 66 is like continuous presence, current speaker ($CP_{CS}$) stream 62 but includes last speaker stream 64 in place of current speaker stream 60. Continuous presence, last speaker ($CP_{LS}$) stream 66 allows a CP client, who is the current speaker, to view several streams simultaneously, one of which is the last speaker. As with continuous presence, current speaker ($CP_{CS}$) stream 62, the other steams in continuous presence, last speaker ($CP_{LS}$) stream 66 may be fixed streams, streams from other endpoints 12, streams from a video presentation, a slideshow, streams from a computer, or streams from any other suitable visual representation. As shown in FIG. 3, video bridge 16 communicates continuous presence, last speaker ($CP_{LS}$) stream 66 to media switch 14a, which communicates stream 66 to media switches 14c. Media switch 14c communicates continuous presence, last speaker ($CP_{LS}$) stream 66 to endpoint 12c.

Stream controller 18 communicates instructions to media switches 14 to control the processing and/or communication of streams 60, 62, 64, and 66 as described above. In alternative embodiment, stream controller 18 may communicate instructions to endpoints 12 and video bridge 16 regarding the processing and/or communication of streams 60, 62, 64, and 66. Stream controller 18 also may communicate instructions to control the processing or communication of the other streams that video bridge 16 combines with current speaker stream 60 and last speaker stream 64 to generate continuous presence, current speaker ($CP_{CS}$) stream 62 and continuous presence, last speaker ($CP_{LS}$) stream 66.

Figure 4:
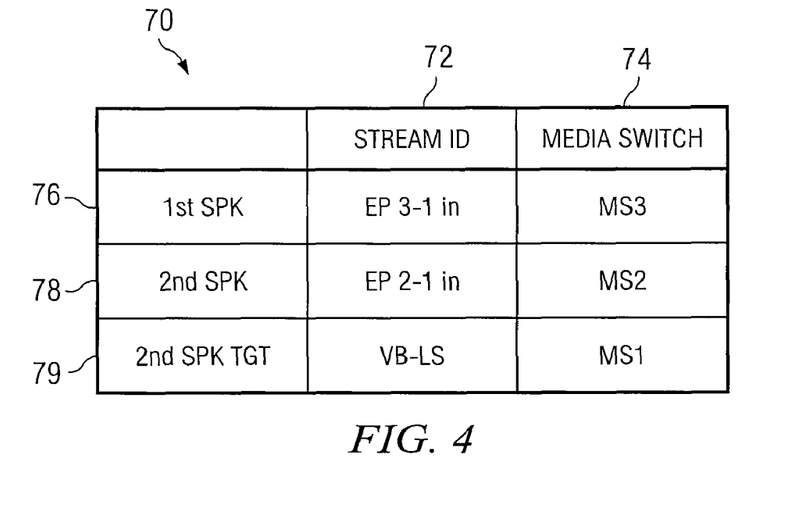
FIG. 4 illustrates an example VA steam map table that a stream controller may use to control the voice activated multitask group in the example video conferencing system of FIG. 3.

FIG. 4 illustrates an example VA stream map table 70 that stream controller 18 may use to control voice activated multicast group 20 in the example video conferencing system 10 of FIG. 3. Table 70 identifies the video streams by their stream IDs in first column 72 and the media switch ID in second column 74

First row 76 of table 70 identifies the current speaker stream 60 that is multicast to the VA clients, such as endpoints 12 that subscribed to voice activated multicast group 20. In the example of FIG. 3, the current speaker is endpoint 12c. First row 76 identifies stream 60 of endpoint 12c as "EP 3-1 in," which stands for the input stream of endpoint 3-1. First row 76 also identifies media switch 14c (MS3), as the media switch that receives stream 60. Table 70 does not specify a target for the current speaker's video stream because, as mentioned above, current speaker stream 60 is multicast to the VA clients.

Second row 78 identifies last speaker stream 64. In the example of FIG. 3, the last speaker is endpoint 12a. Second row identifies stream 64 of endpoint 12a as "EP 2-1 in," which stands for the input stream of endpoint 2-1. Second row 78 also identifies media switch 14b (MS2), as the media switch that receives last speaker stream 64.

Third row 79 identifies the target of last speaker stream 64 identified in second row 78. In the example of FIG. 3, the target of the last speaker stream 64 is video bridge 16 (because the current speaker is a CP client). Third row 79 identifies the target as "VB-LS," which is the name of the last speaker stream communicated from media switch 14a to video bridge 16. Third row 79 also identifies the media switch to which the last speaker's video stream should be communicated, which is media switch 14a (MS1).

Figure 5:
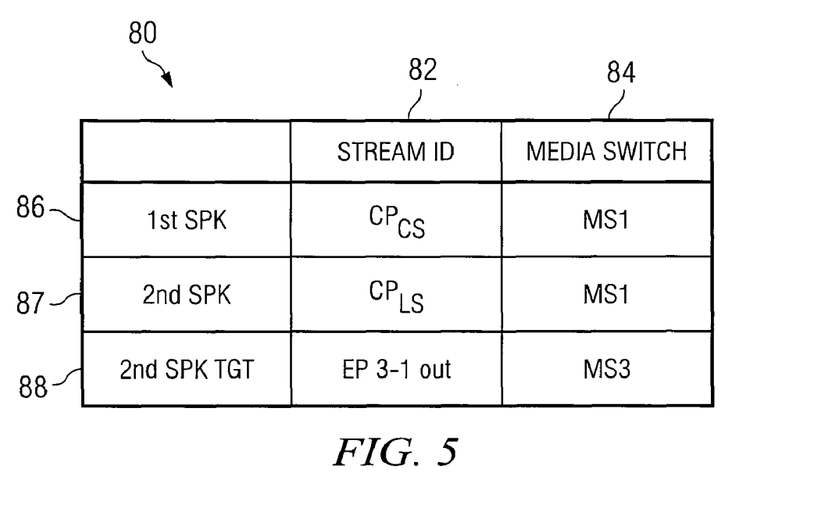
FIG. 5 illustrates an example CP steam map table that a stream controller may use to control the continuous presence multitask group in the example video conferencing system of FIG. 3.

FIG. 5 illustrates example CP stream map table 80 that stream controller 18 may use to control the continuous presence multitask group 22 in the example video conferencing system 10 of FIG. 3. Table 80 identifies the video streams by their stream IDs in first column 82 and media switch ID in second column 84

First row 86 of table 80 identifies continuous presence, current speaker ($CP_{CS}$) stream 62 that is multicast to the CP clients (e.g., endpoints 12 subscribed to continuous presence multitask group 20). In the example of FIG. 3, video bridge 16 generates and communicates current speaker continuous presence ($CP_{CS}$) stream 62 to media switch 14. First row 86 identifies this stream as "$CP_{CS}$." First row 76 also identifies media switch 14a (MS1), as the media switch that receives this stream. Table 70 does not specify a target for this stream because, as mentioned above, continuous presence, current speaker ($CP_{CS}$) stream 62 is multicast to the CP clients.

Second row 88 identifies continuous presence, last speaker ($CP_{LS}$) stream 66. In the example of FIG. 3, video bridge 16 generates and communicates continuous presence, last speaker ($CP_{LS}$) stream 66 to media switch 14(*a*). Second row 88 identifies this stream 66 as "$CP_{LS}$." Second row 88 also identifies media switch 14a (MS1), as the media switch that receives this stream 66.

Third row 89 identifies the target of continuous presence, last speaker ($CP_{LS}$) stream 66 in second row 88. In the example of FIG. 3, continuous presence, last speaker ($CP_{LS}$) stream 66 is communicated to endpoint 12c. Third row 79 identifies the target stream as "EP 3-1 out," which stands for the output stream to endpoint 3-1. Third row 89 also identifies media switch 14c (MS3) as the media switch 14 to which continuous presence, last speaker ($CP_{LS}$) stream 66 should be communicated.

Figure 6:
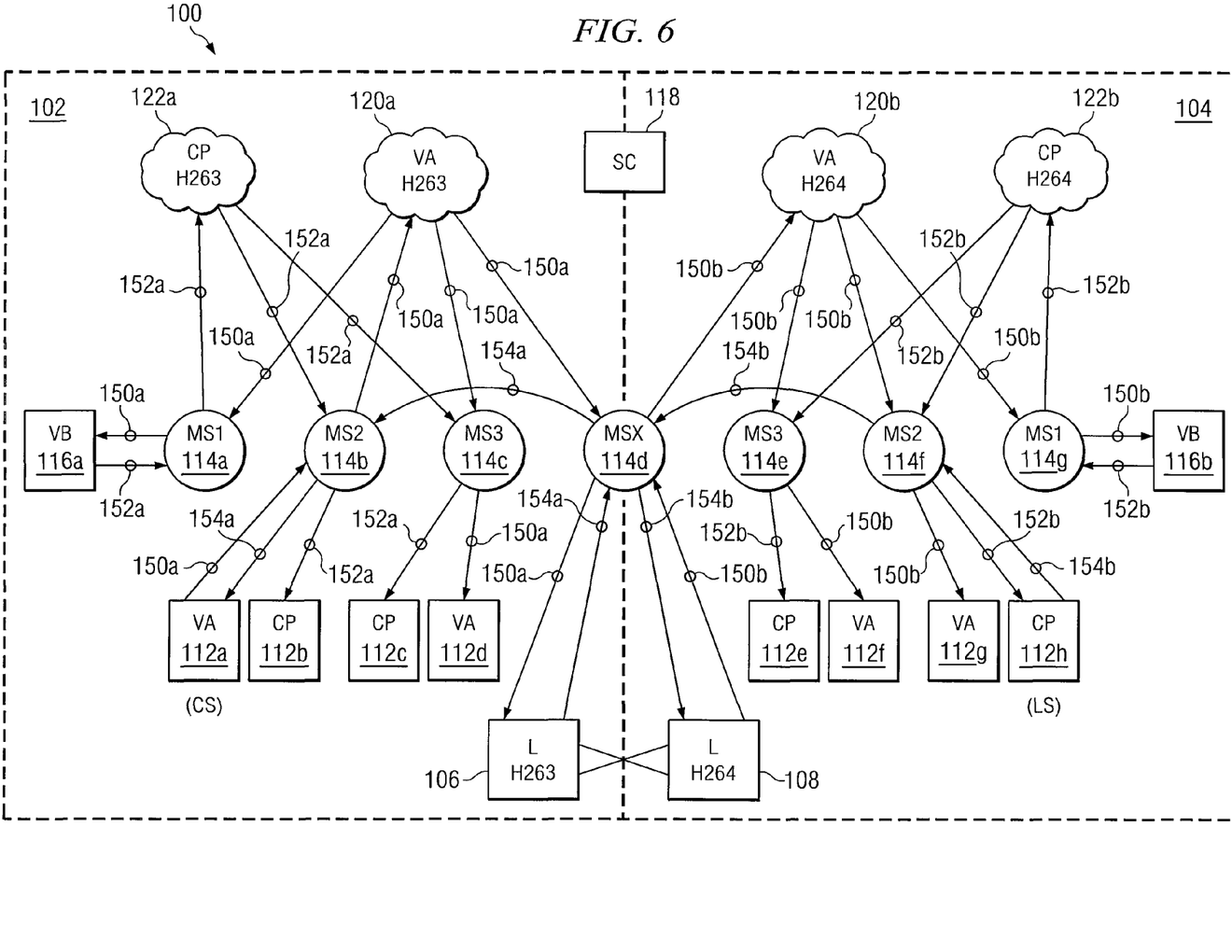
FIG. 6 is an example of a video conferencing system implementing transcoding and/or transrating, in which the current speaker is a voice activated endpoint.

FIG. 6 is an example of a video conferencing system 100 implementing transcoding and/or transrating, in which the current speaker is a VA client. Similar to FIGS. 1-3, system 100 in FIG. 6 includes endpoints 12a, 12b, 12c, 12d, 12e, 12f, 12g, and 12h (generally, endpoints 12); media switches 14a, 14b, 14c, 14d, 14e, 14f, and 14g (generally, media switches 14); video bridges 16a and 16b (generally, video bridges 16); stream controller 118, voice activated multicast groups 120a and 120b (generally, voice activated multicast group 120), and continuous presence multicast groups 122a and 122b (generally, continuous presence multicast group 122). Generally, these elements operate as described above in FIGS. 1-3. For example, voice activated multicast groups 120a and 120b multicast current speaker streams 150a and 150b, and continuous presence multicast groups 122a and 122b multicast continuous presence, current speaker ($CP_{CS}$) streams 152a and 152b.

In FIG. 6, a first portion 102 of system 100 operates using one codec (in this example, H263), and a second portion 104 of system 100 operates using a different codec (in this example, H264). In system 100, the transcoding and/or transrating is implemented by a pair of virtual clients 106 and 108. Virtual client 106 is subscribed to voice activated multicast group 120a, and virtual client 108 is subscribed to voice activated multicast group 120b.

Endpoints 112a, 112d, 112f, and 112g joined the video conference as VA clients. Endpoints 112a and 112d subscribed to voice activated multicast group (H263) 120a, and endpoints 112f and 112g subscribed to voice activated multicast group (H264) 120b. In this example, endpoint 112a has been designated the current speaker (CS).

Endpoints 112b, 112c, 112e, and 112h joined the video conference as CP clients. Endpoints 112b and 112c subscribed to continuous presence multicast group (H263) 122a, and endpoints 112e and 112h subscribed to continuous presence multicast group (H264) 122b. In this example, endpoint 112h has been designated the last speaker (LS).

Video bridges 116 joined the video conference as VA clients. Video bridge 116a subscribed to voice activated multicast group (H263) 120a, and video bridge 116b subscribed to voice activated multicast group (H264) 120b.

Endpoint 112a, the current speaker, multicasts its current speaker stream 150a to the VA clients in portion 102 of system 100, which includes endpoint 112d, video bridge 116a, and virtual client 106. Endpoint 112a communicates its current speaker stream 150a to media switch 114b, which communicates stream 150a via voice activated multicast group 120a to media switches 114a, 114b, and 114c. Media switch 114a communicates current speaker stream 150a to video bridge 116a, media switch 114c communicates current speaker stream 150a to endpoint 12d, and media switch 114d communicate current speaker stream 150a to virtual client 106.

Virtual clients 106 and 108 transcode or transrate current speaker stream 150a from the coding protocol supported by portion 102 of system 100 to the coding stream protocol supported by portion 104 of system 100. As a result, virtual client 106 and 108 generate current speaker stream 150b, which correspond to current speaker stream 150a. In this particular example, current speaker stream 150a is H263, and current speaker stream 150b is H264.

Virtual client 108 is the logical current speaker in portion 104 of system 100. Thus, consistent with the prior description of the voice activated implementation, virtual client 108 multicasts its current speaker stream 150b to the VA clients in portion 104 of system 100, which include endpoints 112f and 112g, and video bridge 116b. Virtual client 108 communicates current speaker stream 150b to media switch 114d, which communicates stream 150b via voice activated multicast group 120b to media switches 114e, 114f, and 114g. Media switch 114e communicates current speaker stream 150b to endpoint 112f, media switch 114f communicates current speaker stream 150b to endpoint 112g, and media switch 114g communicates current speaker stream 150b to video bridge 116b.

Video bridges 116a and 116b receive current speaker streams 150a and 150b, generate continuous presence, current speaker ($CP_{CS}$) streams 152a and 152b, and multicasts continuous presence, current speaker ($CP_{CS}$) streams 152a and 152b to the CP clients, which include endpoints 112b, 112c, 112e, and 112h. Because video bridge 116a and 116b are VA clients, video bridges 116a and 116b receive current speaker streams 150a and 150b when these streams are multicast to the voice activated multicast groups 120a and 120b. Video bridges 116a and 116b use current speaker streams 150a and 150b to generate continuous presence, current speaker ($CP_{CS}$) streams 152a and 152b. Continuous presence, current speaker ($CP_{CS}$) streams 152a and 152b allow participant to view several streams simultaneously, one of which is the current speaker. The other steams may be fixed streams, streams from other endpoints 112, streams from a video presentation, a slideshow, streams from a computer, or streams from any other suitable visual representation.

Video bridge 116a communicates continuous presence, current speaker ($CP_{CS}$) stream 152a to media switch 114a, which communicates stream 152a via continuous presence multicast group 122a to media switches 114b and 114c. Media switch 114b communicates continuous presence, current speaker ($CP_{CS}$) stream 152a to endpoint 112b, and media switch 114c communicates continuous presence, current speaker ($CP_{CS}$) stream 152a to endpoint 112c.

Video bridge 116b communicates continuous presence, current speaker ($CP_{CS}$) stream 152b to media switch 114g, which communicates stream 152b via continuous presence multicast group 122b to media switches 114e and 114f. Media switch 114e communicates continuous presence, current speaker ($CP_{CS}$) stream 152b to endpoint 112e, and media switch 114f communicates continuous presence, current speaker ($CP_{CS}$) stream 152b to endpoint 112h.

Endpoint 112h, which is designated as the last speaker in this example, unicasts its last speaker (LS) stream 154b to virtual client 108, which is the logical current speaker is portion 104 of system 100. Because virtual client 108 is a voice activated client, it would typically receive current speaker stream 150b from voice activated multicast group 120b. Because virtual client 108 is the logical current speaker in portion 104 of system 100, virtual client 108 receives last speaker stream 154b of the last speaker. Endpoint 12h communicates last speaker stream 154b to media switch 114f, which communicates it to media switch 14d. Media switch 14d communicates last speaker stream 154b to virtual client 108.

Virtual clients 106 and 108 transcode or transrate last speaker stream 154b from the coding or rating protocol supported by portion 104 of system 100 to the coding or rating protocol supported by portion 102 of system 100. As a result, virtual clients 106 and 108 generate last speaker stream 154a, which correspond to last speaker stream 154b. In this particular example, last speaker stream 154a is H263, and last speaker stream 154b is H264.

Virtual client 106, which is the logical last speaker in portion 102 of system 100, unicasts last speaker stream 154a to endpoint 112a, which is the current speaker. Endpoint 112a is a VA client and thus would typically receive current speaker stream 150a from voice activated multicast group 120a. Because endpoint 112a is the current speaker, current speaker stream 150a would present the participant at endpoint 112a with a video of himself or herself. Rather than present the participant at endpoint 112a with a video of himself or herself, endpoint 112a receives stream 154a of the last speaker. Virtual client 106 communicates last speaker stream 154a to media switch 114d, which communicates it to media switch 114b. Media switch 114b communicates last speaker stream 154a to endpoint 112a.

Stream controller 118 communicates instructions to media switches 114 to control the processing and/or communication of streams 150, 152, and 154 as described above. In an alternative embodiment, stream controller 118 may communicate instructions to endpoints 12 and video bridges 16 regarding the processing and/or communication of streams 150, 152, and 154. Stream controller 118 also may communicate instructions to control the processing or communication of the other streams that video bridge 116 combines with current speaker stream 150 to generate continuous presence, current speaker ($CP_{CS}$) stream 152.

Figure 7:
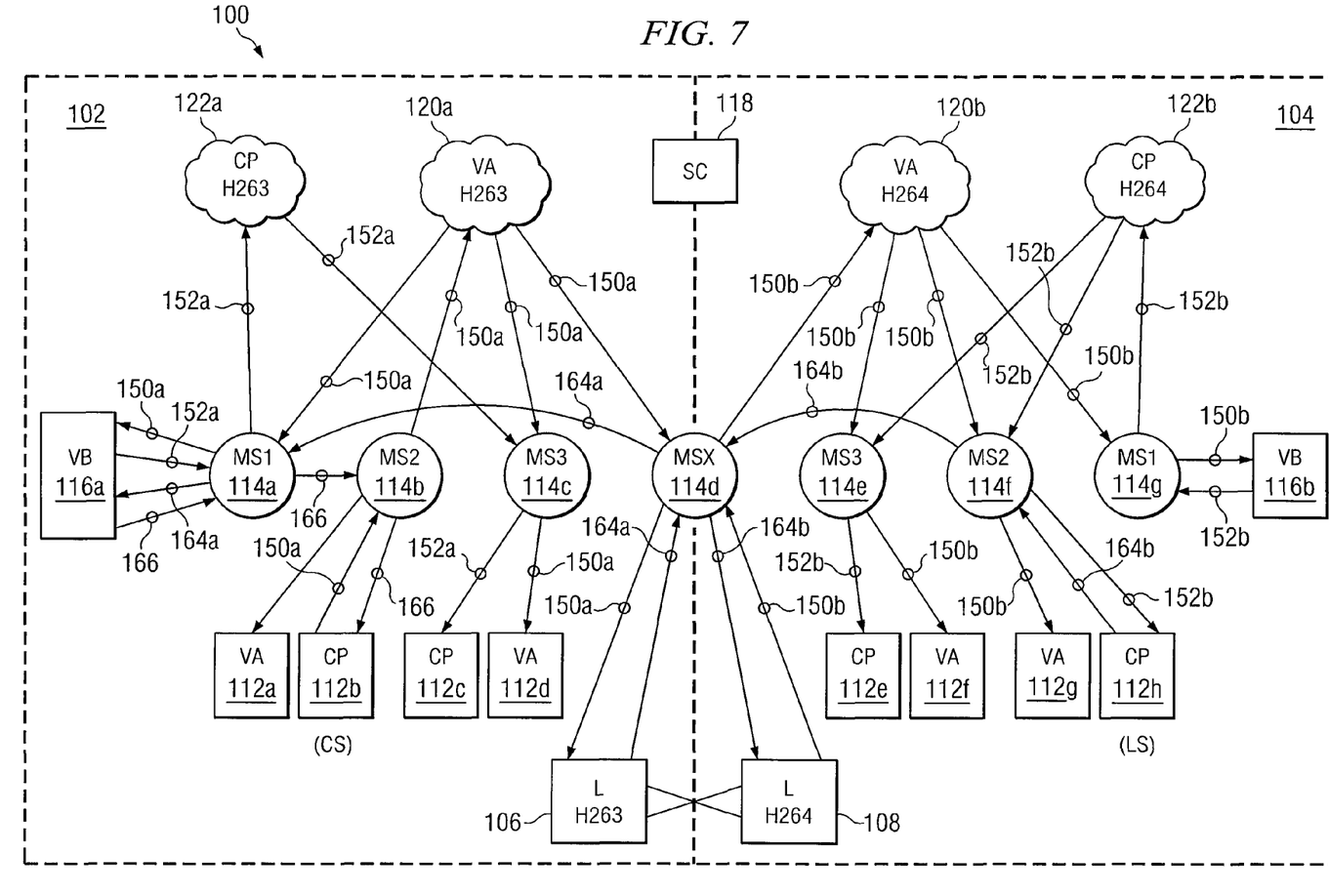
FIG. 7 is an example of a video conferencing system implementing transcoding and/or transrating, in which the current speaker is a continuous presence voice activated endpoint.

FIG. 7 is an example of video conferencing system 100 implementing transcoding and/or transrating, in which the current speaker is a CP client. As in FIG. 6, system 110 in FIG. 7 includes endpoints 12a, 12b, 12c, 12d, 12e, 12f, 12g, and 12h (generally, endpoints 12); media switches 14a, 14b, 14c, 14d, 14e, 14f, and 14g (generally, media switches 14); video bridges 16a and 16b (generally, video bridges 16); stream controller 118, voice activated multicast group 120a and 120b (generally, voice activated multicast group 120), and continuous presence multicast group 122a and 122b (generally, continuous presence multicast group 122). Voice activated multicast groups 120a and 120b multicast current speaker streams 150a and 150b, and continuous presence multicast groups 122a and 122b multicast continuous presence, current speaker ($CP_{CS}$) streams 152a and 152b.

A first portion 102 of system 100 operates using one codec (in this example, H263), and a second portion 104 of system 100 operates using a different codec (in this example, H264). In system 100, the transcoding and/or transrating is implemented by a pair of virtual clients 106 and 108. Virtual client 106 is subscribed to voice activated multicast group 120a, and virtual client 108 is subscribed to voice activated multicast group 120b.

Endpoints 112a, 112d, 112f, and 112g joined the video conference as VA clients. Endpoints 112a and 112d subscribed to voice activated multicast group (H263) 120a, and endpoints 112f and 112g subscribed to voice activated multicast group (H264) 120b.

Endpoints 112b, 112c, 112e, and 112h joined the video conference as CP clients. Endpoints 112b and 112c subscribed to continuous presence multicast group (H263) 122a, and endpoints 112e and 112h subscribed to continuous presence multicast group (H264) 122b. In this example, endpoint 112b has been designated the current speaker (CS), and endpoint 112h has been designated the last speaker (LS).

Video bridges 116 joined the video conference as a VA client. Video bridge 116a subscribed to voice activated multicast group 120a, and video bridge 116b subscribed to voice activated multicast group 120b.

Endpoint 112b, the current speaker, multicasts its current speaker stream 150a to the VA clients in portion 102 of system 100, which includes endpoints 112a and 112d, video bridge 116a, and virtual client 106. As shown in FIG. 6, endpoint 112b communicates its current speaker stream 150a to media switch 114b, which communicates stream 150a via voice activated multicast group 120a to media switches 114a, 114c, and 114d. Media switch 114b also communicates stream 150a to endpoint 112a. Media switch 114a communicates current speaker stream 150a to video bridge 116a, media switch 114c communicates current speaker stream 150a to endpoint 12d, and media switch 114d communicate current speaker stream 150a to virtual client 106.

Virtual clients 106 and 108 transcode or transrate current speaker stream 150a from the coding or rating protocol supported by portion 102 of system 100 to the coding or rating protocol supported by portion 104 of system 100. As a result, virtual client 106 and 108 generate current speaker stream 150b, which corresponds to current speaker stream 150a. In this particular example, current speaker stream 150a is H263, and current speaker stream 150b is H264.

Virtual client 108 is the logical current speaker in portion 104 of system 100. Thus, consistent with the prior description of the voice activated implementation, virtual client 108 multicasts its current speaker stream 150b to the VA clients in portion 104 of system 100, which include endpoints 112f and 112g, and video bridge 116b. As shown in FIG. 7, virtual client 108 communicates current speaker stream 150b to media switch 114d, which communicates stream 150b via voice activated multicast group 120b to media switches 114e, 114f, and 114g. Media switch 114e communicates current speaker stream 150b to endpoint 112f, media switch 114f communicates current speaker stream 150b to endpoint 12g, and media switch 114g communicate current speaker stream 150b to video bridge 116b.

Video bridges 116a and 116b receive current speaker stream 150a and 150b, generate continuous presence, current speaker ($CP_{CS}$) streams 152a and 152b, and multicasts continuous presence, current speaker ($CP_{CS}$) stream 152a and 152b to the CP clients, which include endpoints 112c, 112e, and 112h. Because video bridge 116a and 116b are VA clients, video bridges 116a and 116b receive current speaker streams 150a and 150b when streams 150a and 150b are multicast to the voice activated multicast groups 120a and 120b. Video bridges 116a and 116b use current speaker streams 150a and 150b to generate continuous presence, current speaker ($CP_{CS}$) streams 152a and 152b. Continuous presence, current speaker ($CP_{CS}$) streams 152a and 152b allow participant to view several streams simultaneously, one of which is the current speaker. The other steams may be fixed streams, streams from other endpoints 112, streams from a video presentation, a slideshow, streams from a computer, or streams from any other suitable visual representation.

Video bridge 116a communicates continuous presence, current speaker ($CP_{CS}$) stream 152a to media switch 14a, which communicates stream 152a via continuous presence multicast group 122a to media switch 114c. Media switch 114c communicates continuous presence, current speaker ($CP_{CS}$) stream 152a to endpoint 112c.

Video bridge 116b communicates continuous presence, current speaker ($CP_{CS}$) stream 152b to media switch 14g, which communicates stream 152b via continuous presence multicast group 122b to media switches 114e and 114f. Media switch 114e communicates continuous presence, current speaker ($CP_{CS}$) stream 152b to endpoint 112e, and media switch 114f communicates continuous presence, current speaker ($CP_{CS}$) stream 152b to endpoint 112h.

Endpoint 112h, which is designated as the last speaker in this example, unicasts its last speaker (LS) stream 164b to virtual client 108, which is the logical current speaker in portion 104 of system 100. Virtual client 108 is a VA client, so stream controller 118 instructs media switch 114f to communicate last speaker stream 164b to virtual client 108 via media switch 114d rather than communicate it to video bridge 116b.

Virtual clients 106 and 108 transcode or transrate last speaker stream 164b from the coding protocol supported by portion 104 of system 100 to the coding protocol supported by portion 102 of system 100. As a result, virtual clients 106 and 108 generate last speaker stream 164a, which correspond to last speaker stream 164b. In this particular example, last speaker stream 164a is H263, and last speaker stream 164b is H264.

Virtual client 106, the virtual last speaker in portion 102 at system 100, unicasts last speaker stream 154a to video bridge 116a. The current speaker is associated which endpoint 112b, a CP client. Endpoint 112b, as a CP client, would typically receive continuous presence, current speaker ($CP_{CS}$) stream 152a from continuous presence multicast group 22. Because endpoint 112b is the current speaker, continuous presence, current speaker ($CP_{CS}$) stream 152a would present the participant at endpoint 112b with a video of himself or herself. Rather than present the participant at endpoint 112b with a video of himself or herself, endpoint 112b receives continuous presence, last speaker ($CP_{LS}$) stream 166, which is the continuous presence stream with the last speaker video instead of the current speaker video. Virtual client 106 communicates last speaker stream 164a to media switch 114d, which communicates it to media switch 114a. Media switch 114a communicates last speaker stream 164a to video bridge 116a. Because the current speaker is a CP client rather than a VA client, last speaker stream 164 is not unicast to the current speaker, endpoint 112b.

Video bridge 116a uses last speaker stream 164a to generate continuous presence, last speaker ($CP_{LS}$) stream 166. Continuous presence, last speaker ($CP_{LS}$) stream 166 is like continuous presence, current speaker ($CP_{CS}$) stream 152a but includes last speaker stream 164a in place of current speaker stream 150a. Continuous presence, last speaker ($CP_{LS}$) stream 166 allows a continuous presence client, who is the current speaker, to view several streams simultaneously, one of which is the last speaker. As with continuous presence, current speaker ($CP_{CS}$) stream 162a, the other steams in continuous presence, last speaker ($CP_{LS}$) stream 166 may be fixed streams, streams from other endpoints 12, streams from a video presentation, a slideshow, streams from a computer, or streams from any other suitable visual representation. As shown in FIG. 7, video bridge 116a communicates continuous presence, last speaker ($CP_{LS}$) stream 166 to media switch 114a, which communicates stream 166 to media switches 114b. Media switch 114b communicates continuous presence, last speaker ($CP_{LS}$) stream 166 to endpoint 12b.

Stream controller 118 communicates instructions to media switches 114 to control the processing and/or communication of streams 150, 152, 164, and 166 as described above. In an alternative embodiment, stream controller 118 may communicate instructions to endpoints 12 and video bridges 16 regarding the processing and/or communication of streams 150, 152, 164, and 166. Stream controller 118 also may communicate instructions to control the processing or communication of the other streams that video bridge 116 combines with current speaker stream 150 and last speaker stream 164 to generate continuous presence, current speaker ($CP_{CS}$) stream 152 and continuous presence, last speaker ($CP_{LS}$) stream 166.

Figure 8:
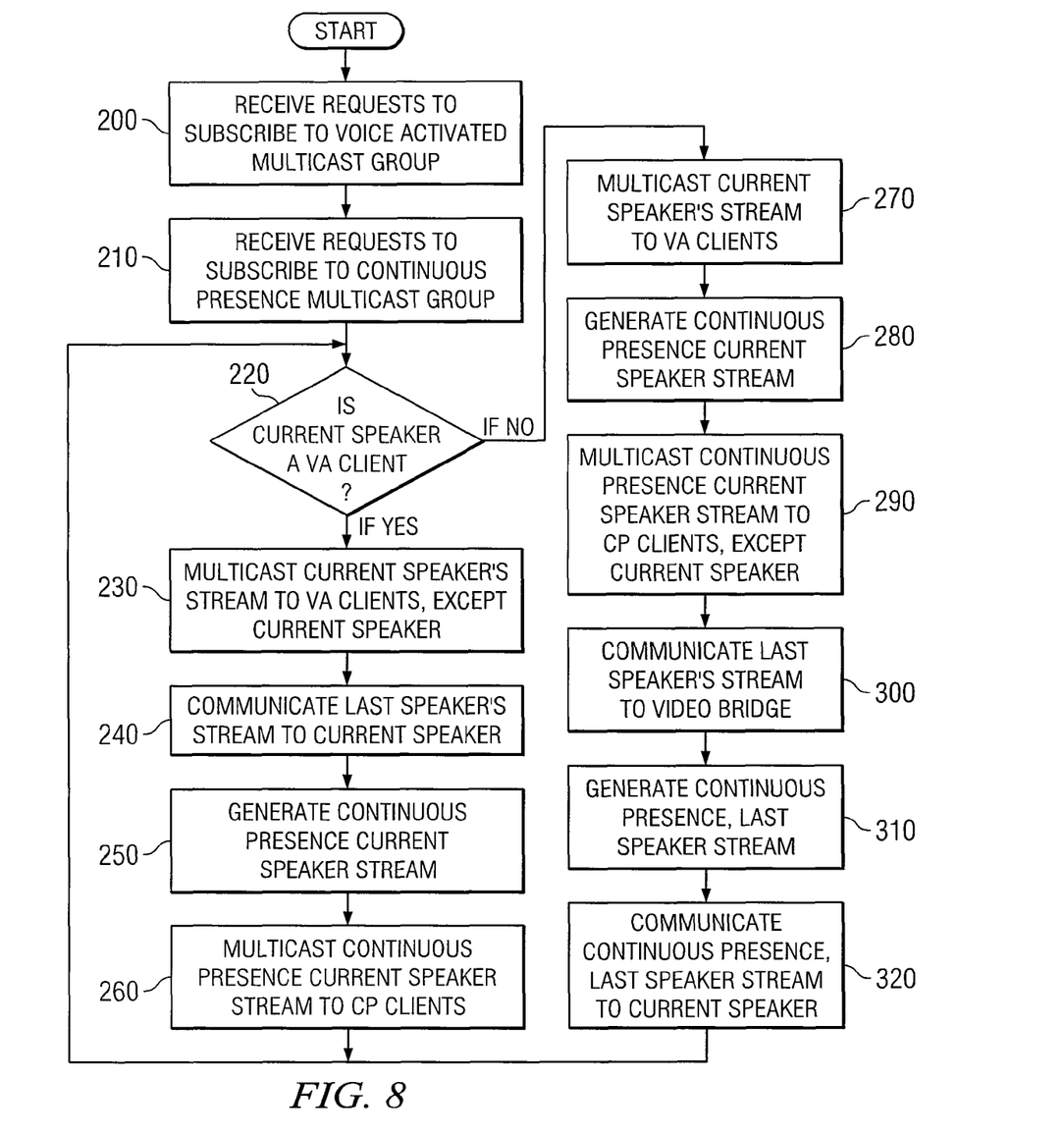
FIG. 8 illustrates an example method for video conferencing.

FIG. 8 illustrates an example method for video conferencing. The method begins at step 200, where stream controller 18 receives requests from VA clients, including endpoints 12a and 12d and video bridge 16, to subscribe to voice activated multicast group 20. At step 210, stream controller 18 receives request from CP clients, including endpoints 12b and 12c, to subscribe to continuous presence multicast group 22.

At step 220, stream controller 18 determines whether the current speaker is a VA client. If the current speaker is a VA client, the method continues at step 230, where stream controller 18 instructs the current speaker (endpoint 12 or media switch 14 associated with current speaker) to multicast the current speaker's stream 50 to VA clients (including video bridge 16), except the current speaker. At step 240, stream controller 18 instructs the last speaker (endpoint 12 or media switch 14 associated with last speaker) to communicate the last speaker's stream 54 to the current speaker (endpoint 12 or media switch 14 associated with current speaker). Stream controller 18 instructs video bridge 16 to generate continuous presence, current speaker stream 52 at step 250 and to multicast stream 52 to CP clients, including endpoints 12b and 12c. The method returns to step 220, to determine if the current speaker is still a VA client.

If the current speaker is not a VA client at step 220, the current speaker is a CP client, and at step 270, stream controller 18 instructs the current speaker (endpoint 12 or media switch 14 associated with current speaker) to multicast the current speaker's stream 60 to VA clients (including video bridge 16). Stream controller 18 instructs video bridge 16 generates continuous presence, current speaker stream 62 at step 280 and to multicast stream 62 to CP clients, except the current speaker, at step 290. At step 300, stream controller 18 instructs the last speaker (endpoint 12 or media switch 14 associated with last speaker) to communicate the last speaker's stream 64 to video bridge 16. Stream controller 18 instructs video bridge 16 to generate continuous presence, last speaker stream 66 at step 310 and to communicate stream 66 to current speaker at step 320. The method returns to step 220, to determine if the current speaker is a VA client.

Figure 9:
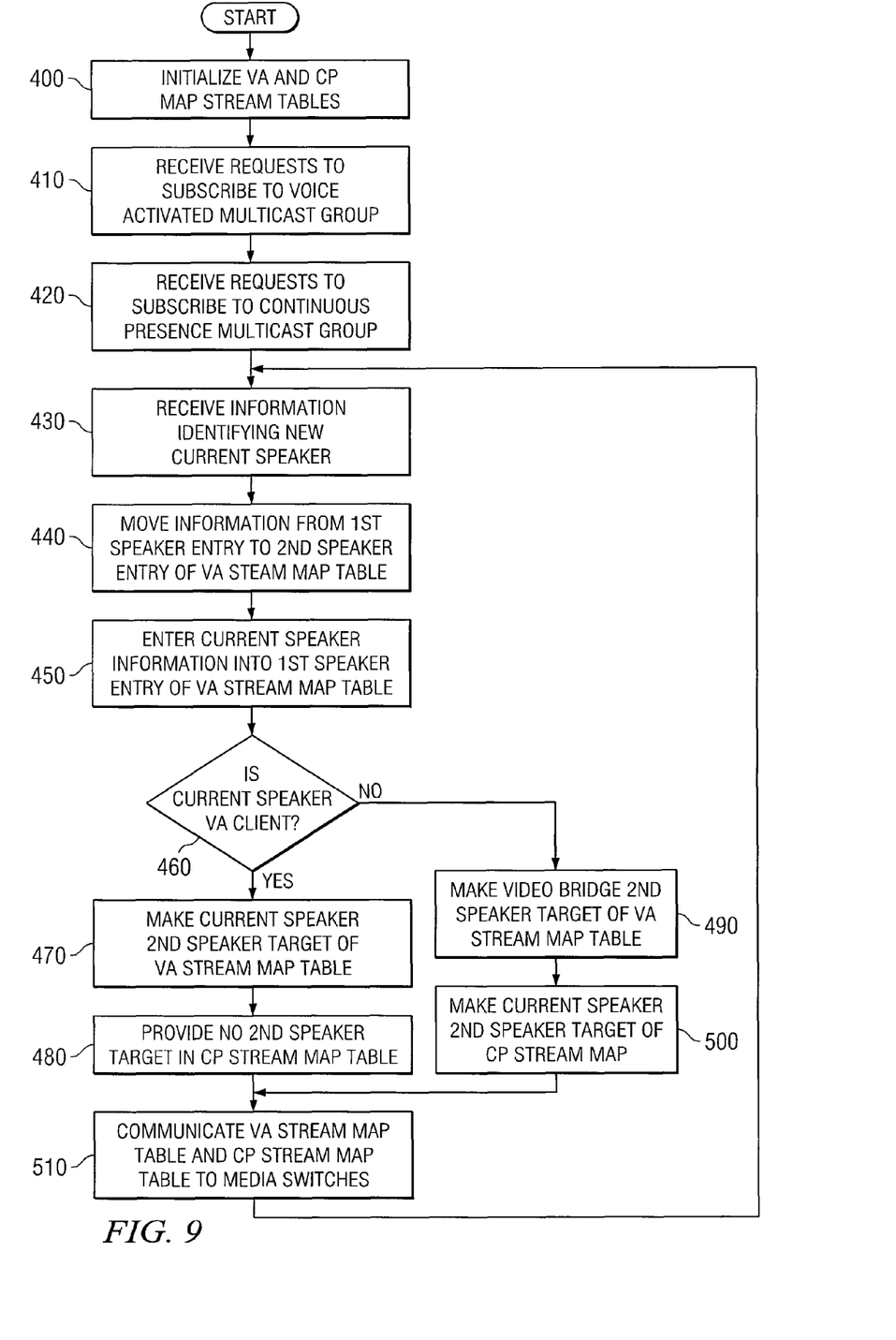
FIG. 9 illustrates an example method of generating stream map tables.

FIG. 9 illustrates an example method of generating VA and CP stream map tables 70 and 80. In a particular embodiment, stream controller 18 may use this method or another method to generate stream map tables, such the example tables illustrated in FIGS. 4 and 5.

The method begin at step 400, where stream controller 18 initializes VA stream map table 70 and CP stream map table 80. In a particular embodiment, stream controller 18 creates VA stream map table 70 with 1st speaker entry 76 for identifying the current speaker stream, 2nd speaker entry 78 for identifying the last speaker stream, and 2nd speaker target entry 79 for identifying the intended recipient of the last speaker stream. In a particular embodiment, stream controller 18 creates CP stream map 80 with 1st speaker entry 86 identifying continuous presence, current speaker stream, 2nd speaker entry 87 identifying continuous presence, last speaker stream, and 2nd speaker target entry 88 for identifying the intended recipient of the continuous presence, last speaker stream. In a particular embodiment, 1st speaker entry 86 includes information, such as stream ID 82 and media switch ID 84, identifying continuous presence, current speaker stream, and 2nd speaker entry 87 includes information, such as stream ID 82 and media switch ID 84, identifying continuous presence, last speaker stream.

At step 410, stream controller 18 receives requests from VA clients, such as endpoints 12a and 12d and video bridge 16, to subscribe to voice activated multicast group 20. At step 420, stream controller 18 receives request from CP clients, such as endpoints 12b and 12c, to subscribe to continuous presence multicast group 22.

At step 430, stream controller 18 receives information identifying a new current speaker. In a particular embodiment, an external device, such as an audio mixer, provides this information. In response to receiving the information identifying the new current speaker, stream controller 18 moves the information from the 1st speaker entry 76 to 2nd speaker entry 78 of VA stream map table 70 at step 440. This change is made to indicate that the old current speaker is the new last speaker. At step 450, stream controller enters current speaker information into the 1st speaker entry 76 of VA stream map table 70. In a particular embodiment, the current speaker information includes the stream ID 72 and media switch ID 74 associated with the current speaker.

At step 460, stream controller 18 determines whether the new current speaker is a VA client. If the new current speaker is a VA client, the method continues at step 470, where stream controller 18 makes the current speaker the target of the 2nd speaker stream of VA stream map table 70 at step 470. In a particular embodiment, stream controller 18 identifies current speaker in 2nd speaker target 79 of VA stream map table 70 by entering the current speaker's input stream ID 72 and media switch ID 74. At step 480, stream controller 18 provides no 2nd speaker stream target 88 in CP stream map table 80.

If the new current speaker is not a VA client at step 460, then the new current speaker is a CP client, and the method continues at step 490, where stream controller 18 makes video bridge 16 the 2nd speaker target 79 in VA stream map 70. At step 500, stream controller 18 makes the current speaker the 2nd speaker target 88 of CP stream map 80.

At step 510, stream controller 18 communicates VA stream map table 70 and CP stream map table 80 to media switches 14. In a particular embodiment, stream controller 18 communicates tables 70 and 80 to other network devices supporting the video conference. In a particular embodiment, stream controller 18 communicates only information that has changed in tables 70 and 80. The method returns to step 430 to wait for information identifying a new current speaker.

Figure 10:
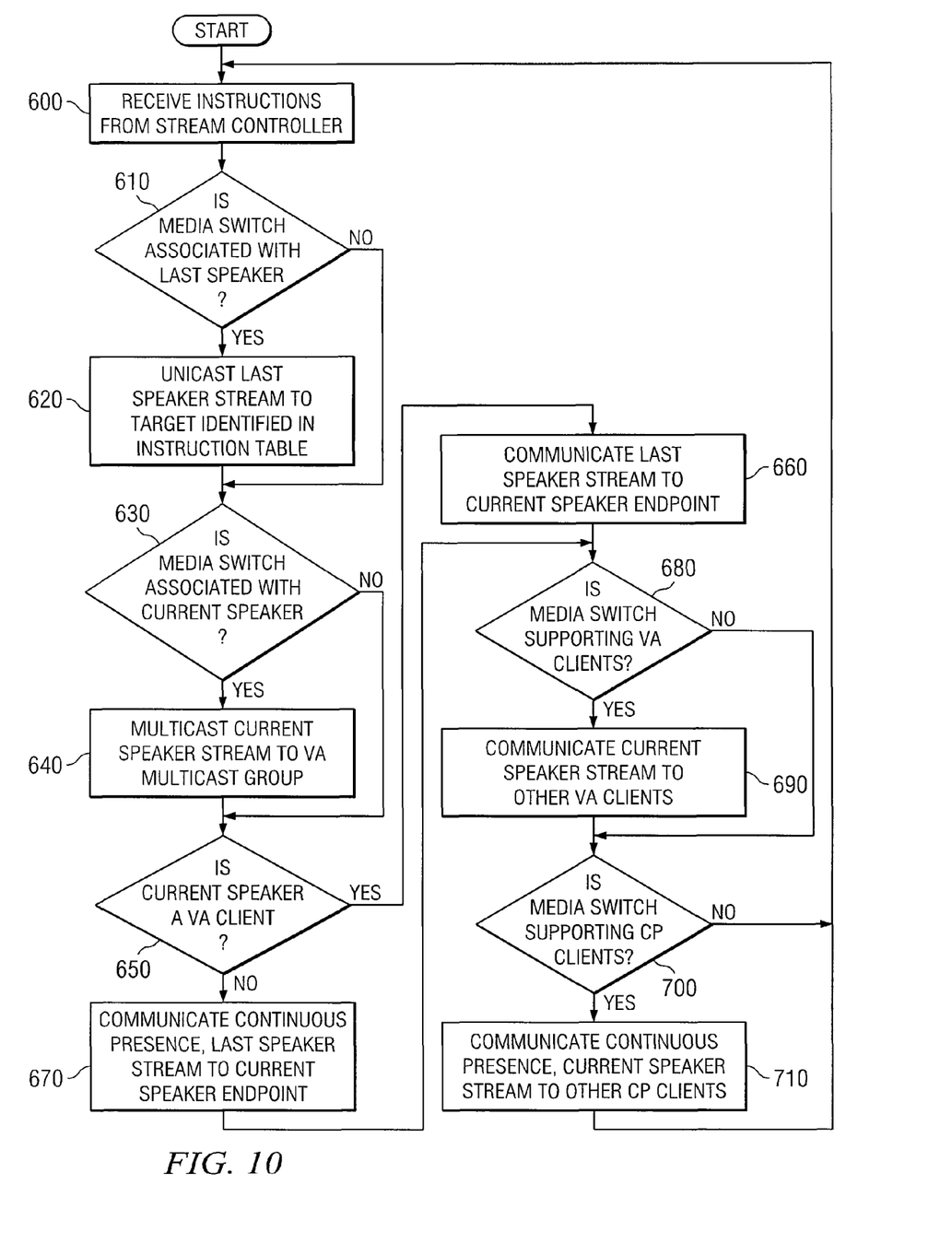
FIG. 10 illustrates an example method for communicating video streams at a media switch in support of a video conference.

FIG. 10 illustrates an example method for communicating video streams at media switch 14 in support of a video conference. The method begins at step 600, where media switch 14 receives instructions from stream controller 18. In a particular embodiment, the instructions comprise VA stream map table 70 and CP stream map table 80.

If media switch 14 is associated with the last speaker identified in the instructions at step 610, media switch 14 unicasts the last speaker stream to the last speaker target identified in the instructions at step 620. In a particular embodiment, media switch 14 determines whether it is associated with the last speaker by determining whether it is identified in the media switch ID 74 of 2nd speaker entry 78 of VA map stream table 70. In a particular embodiment, media switch 14 unicasts the last speaker stream to the 2nd speaker target 79 identified in VA stream map table 70.

If media switch 14 is associated with the current speaker identified in the instructions at step 630, media switch 14 multicasts the current speaker stream to the VA multicast group 20 at step 640. In a particular embodiment, media switch 14 determines whether it is associated with the current speaker by determining whether it is identified in the media switch ID 74 of 1st speaker entry 76 of VA map stream table 70. If the current speaker is a VA client at step 650, media switch 14 communicates the last speaker stream to the current speaker endpoint 12 at step 660. In a particular embodiment, media switch 14 receives the last speaker stream from another media switch 14 or other network device and communicates the stream to current speaker endpoint 12. If the current speaker is not a VA client at step 650, then the current speaker is a CP client, and media switch 14 communicates continuous presence, last speaker stream to the current speaker endpoint 12 at step 670. In a particular embodiment, media switch 14 receives the continuous presence, last speaker stream from video bridge 16 or other network device and communicates the stream to current speaker endpoint 12.

If media switch 14 is supporting VA clients (other than the current speaker) at step 680, media switch 14 communicates the current speaker stream to the other VA clients at step 690. In a particular embodiment, media switch 14 receives the current speaker stream from another media switch 14 or other network device that multicast the current speaker stream to voice activated multicast group 20, and media switch 14 communicates the current speaker stream to one or more endpoints 12 that subscribed to voice activated multicast group 20.

If media switch 14 is supporting CP client (other than the current speaker) at step 700, media switch 14 communicates the continuous presence, current speaker stream to the other CP clients at step 710. In a particular embodiment, media switch 14 receives the continuous presence, current speaker stream from video bridge 16 or other network device that multicast the continuous presence, current speaker stream to continuous presence multicast group 22, and media switch 14 communicates the continuous presence, current speaker stream to one or more endpoints 12 that subscribed to continuous presence multicast group 22.

The method continues at step 600, when the media switch 14 receives new instruction from stream controller 18.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. A method for video conferencing comprising:
   receiving a request to subscribe to a voice activated (VA) multicast group from one or more VA endpoints;
   receiving a request to subscribe to a continuous presence (CP) multicast group from one or more CP endpoints;
   multicasting a current speaker's stream to the VA endpoints that are not the current speaker; and
   multicasting a continuous presence, current speaker stream to the CP endpoints that are not the current speaker, wherein the continuous presence, current speaker video stream comprises two or more video streams, one of which includes at least a portion of the current speaker's video stream.

2. The method of claim 1, further comprising:
   determining that one of the VA endpoint is the current speaker; and
   unicasting a last speaker's stream to the VA endpoint that is the current speaker.

3. The method of claim 1, further comprising:
   determining that one of the CP endpoints is the current speaker; and
   unicasting a continuous presence, last speaker stream to the CP endpoint that is the current speaker, wherein the continuous presence, last speaker stream comprises two or more video streams, one of which includes at least a portion of a last speaker's video stream.

4. The method of claim 1, further comprising:
   receiving a request to subscribe to the voice activated multicast group from a bridge;
   communicating the current speaker's stream to the bridge; and
   generating the continuous presence, current speaker stream at the bridge.

5. The method of claim 1, further comprising:
   communicating a last speaker's stream to a video bridge if one of the CP endpoints is the current speaker;
   generating a continuous presence, last speaker stream at the video bridge, wherein the continuous presence, last speaker stream comprises two or more video streams, one of which includes at least a portion of a last speaker's video stream; and
   communicating the continuous presence, last speaker stream to the CP endpoint that is the current speaker.

6. The method of claim 1, further comprising transcoding the current speaker's stream from one codec to another codec.

7. The method of claim 1, wherein the multicasting the current speaker's stream to the VA endpoints involves one or more media switch that communicate the current speaker's stream to the VA endpoints.

8. A system comprising:
   at least one interface configured to:
      receive a request to subscribe to a voice activated (VA) multicast group from one or more VA endpoints;
      receive a request to subscribe to a continuous presence (CP) multicast group from one or more CP endpoints;
   at least one processor configured to:
      cause multicasting of a current speaker's stream to the VA endpoints that are not the current speaker; and
      cause multicasting of a continuous presence, current speaker stream to the CP endpoints that are not the current speaker, wherein the continuous presence, current speaker video stream comprises two or more video streams, one of which includes at least a portion of the current speaker's video stream.

9. The system of claim 8, wherein the at least one processor is further configured to:
   determine that one of the VA endpoints is the current speaker; and
   unicast a last speaker's stream to the VA endpoint that is the current speaker.

10. The system of claim 8, wherein the at least one processor is further configured to:
    determine that one of the CP endpoints is the current speaker; and
    unicast a continuous presence, last speaker stream to the CP endpoint that is the current speaker, wherein the continuous presence, last speaker stream comprises two or more video streams, one of which includes at least a portion of a last speaker's video stream.

11. The system of claim 8, wherein the at least one processor is further configured to: receive a request to subscribe to the voice activated multicast group from a bridge; communicate the current speaker's stream to the bridge; and generate the continuous presence, current speaker stream at the bridge.

12. The system of claim 8, wherein the at least one processor is further configured to: cause communication of a last speaker's stream to a video bridge if one of the CP endpoints is the current speaker; generate a continuous presence, last speaker stream at the video bridge, wherein the continuous presence, last speaker stream comprises two or more video streams, one of which includes at least a portion of a last speaker's video stream; and cause communication of the continuous presence, last speaker stream to the CP endpoint that is the current speaker.

13. The system of claim 8, wherein the at least one processor is further configured to transcode the current speaker's stream from one codec to another codec.

14. The system of claim 8, wherein the at least one processor is configured to cause multicasting of the current speaker's stream to the VA endpoints using one or more media switches that communicate the current speaker's stream to the VA endpoints.

15. At least one non-transitory computer-readable medium comprising instructions that, when executed by at least one processor, are configured to:
    receive a request to subscribe to a voice activated (VA) multicast group from one or more VA endpoints;
    receive a request to subscribe to a continuous presence (CP) multicast group from one or more CP endpoints;
    cause multicasting of a current speaker's stream to the VA endpoints that are not the current speaker; and
    cause multicasting of a continuous presence, current speaker stream to the CP endpoints that are not the current speaker, wherein the continuous presence, current speaker video stream comprises two or more video streams, one of which includes at least a portion of the current speaker's video stream.

16. The medium of claim 15, wherein the instructions, when executed, are further configured to: determine that one of the VA endpoints is the current speaker; and unicast a last speaker's stream to the VA endpoint that is the current speaker.

17. The medium of claim 15, wherein the instructions, when executed, are further configured to: determine that one of the CP endpoints is the current speaker; and unicast a continuous presence, last speaker stream to the CP endpoint that is the current speaker, wherein the continuous presence, last speaker stream comprises two or more video streams, one of which includes at least a portion of a last speaker's video stream.

18. The medium of claim 15, wherein the instructions, when executed, are further configured to: receive a request to subscribe to the voice activated multicast group from a bridge; communicate the current speaker's stream to the bridge; and generate the continuous presence, current speaker stream at the bridge.

19. The medium of claim 15, wherein the instructions, when executed, are further configured to:
cause communication of a last speaker's stream to a video bridge if one of the CP endpoints is the current speaker;
generate a continuous presence, last speaker stream at the video bridge, wherein the continuous presence, last speaker stream comprises two or more video streams, one of which includes at least a portion of a last speaker's video stream; and cause communication of the continuous presence, last speaker stream to the CP endpoint that is the current speaker.

20. The medium of claim 15, wherein the instructions, when executed, are further configured to transcode the current speaker's stream from one codec to another codec.

21. The medium of claim 15, wherein the instructions configured to cause multicasting of the current speaker's stream to the VA endpoints comprises instructions configured to cause multicasting of the current speaker's stream to the VA endpoints using one or more media switches that communicate the current speaker's stream to the VA endpoints.

* * * * *